(12) United States Patent
Pan et al.

(10) Patent No.: US 12,423,154 B2
(45) Date of Patent: Sep. 23, 2025

(54) PROPAGATING JOB CONTEXTS TO A JOB EXECUTION ENVIRONMENT

(71) Applicant: International Business Machines Corporation, Armonk, NY (US)

(72) Inventors: Xun Pan, Xian (CN); Wen Qing Jin, Xian (CN); Chao Deng, Xian (CN); Yu Dong Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 17/648,184

(22) Filed: Jan. 18, 2022

(65) Prior Publication Data
US 2023/0229515 A1  Jul. 20, 2023

(51) Int. Cl.
*G06F 9/50* (2006.01)
*G06F 9/48* (2006.01)

(52) U.S. Cl.
CPC ............ *G06F 9/505* (2013.01); *G06F 9/4881* (2013.01)

(58) Field of Classification Search
CPC ...... G06F 9/505; G06F 9/4881; G06F 9/4843; G06F 9/5027
See application file for complete search history.

(56) References Cited

U.S. PATENT DOCUMENTS

| | | | |
|---|---|---|---|
| 10,514,958 B2 | 12/2019 | Kumar | |
| 10,534,655 B1 | 1/2020 | Kinney, Jr. | |
| 2005/0165881 A1* | 7/2005 | Brooks | G06F 9/5027 709/200 |
| 2012/0192207 A1* | 7/2012 | Kashyap | G06F 9/544 719/319 |
| 2013/0179881 A1 | 7/2013 | Calder | |

(Continued)

FOREIGN PATENT DOCUMENTS

| CN | 112286671 B | 3/2021 |
|---|---|---|
| CN | 113032093 A | 6/2021 |

OTHER PUBLICATIONS

"Notification of Transmittal of the International Search Report and the Written Opinion of the International Searching Authority, or the Declaration", Applicant's or agent's file reference IEE221210PCT, International application No. PCT/CN2023/070588, International filing date Jan. 5, 2023, Date of mailing May 30, 2023, 7 pages.

(Continued)

*Primary Examiner* — Kenneth Tang
(74) *Attorney, Agent, or Firm* — Monchai Chuaychoo

(57) ABSTRACT

In a job management environment comprising a plurality of job systems and a scheduler for scheduling a job submitted to the job management environment to a job system for running, a processor, in a first job system, intercepts, from outside of a first container in the first job system, a first job from being sent to the scheduler. A processor, in the first job system, determines whether the first job is submitted from a container in the first job system. In response to a first determination that the first job is submitted from a container in the first job system, a processor, in the first job system, determines contexts of the first job, the contexts of the first job including a context related to the first container. A processor, in the first job system, sends the first job together with the contexts of the first job to the scheduler.

20 Claims, 6 Drawing Sheets

(56) References Cited

U.S. PATENT DOCUMENTS

| | | | |
|---|---|---|---|
| 2014/0068560 A1* | 3/2014 | Eksten | G06F 8/70 717/120 |
| 2014/0223443 A1 | 8/2014 | Ashok | |
| 2015/0095917 A1* | 4/2015 | Challenger | G06F 9/5027 718/104 |
| 2015/0268881 A1* | 9/2015 | Nielsen | G06F 3/065 711/114 |
| 2016/0170849 A1 | 6/2016 | Cheng | |
| 2017/0364388 A1 | 12/2017 | Sevigny | |
| 2018/0247064 A1* | 8/2018 | Aronovich | G06F 16/24552 |
| 2020/0137097 A1* | 4/2020 | Zimmermann | H04L 63/1425 |
| 2020/0174842 A1* | 6/2020 | Wang | H04L 67/63 |
| 2021/0240818 A1* | 8/2021 | Seksenov | G06F 16/986 |

OTHER PUBLICATIONS

Azab et al., "Software Provisioning Inside a Secure Environment as Docker Containers Using Stroll File-System", 2016 16th IEEE/ACM International Symposium on Cluster, Cloud and Grid Computing (CCGrid), Cartagena, Colombia, May 16-19, 2016, 10 Pages.

Liu et al., "CFS: A Distributed File System for Large Scale Container Platforms", SIGMOD '19: Proceedings of the 2019 International Conference on Management of Data, Amsterdam, Netherlands, Jun. 30-Jul. 5, 2019, 13 Pages.

Mell et al., "The NIST Definition of Cloud Computing", Recommendations of the National Institute of Standards and Technology, NIST Special Publication 800-145, Sep. 2011, 7 pages.

* cited by examiner

PROPAGATING JOB CONTEXTS TO A JOB EXECUTION ENVIRONMENT

BACKGROUND

The present invention relates to computing technologies and, more specifically, to methods, systems, and computer program products for propagating job contexts to a job execution environment.

High performance computing (HPC) is the ability to process data and perform complex calculations at high speeds, and high-throughput computing (HTC) is the use of distributed computing facilities for applications requiring large computing power over a long period of time. Both technologies are related to processing for jobs (workloads) in a job management environment, in which a job scheduler dispatches received jobs to respective job systems. With the development of cloud technology, more and more jobs are submitted from containers.

SUMMARY

The present invention provides a computer-implemented method, system, and computer program product in a job management environment comprising a plurality of job systems and a scheduler for scheduling a job submitted to the job management environment to a job system for running. The method may include intercepting, by one or more processing units in a first job system, from outside of a first container in the first job system, a first job from being sent to the scheduler. The method may also include determining, by one or more processing units in the first job system, whether the first job is submitted from a container in the first job system. The method may also include in response to determining that the first job is submitted from a container in the first job system, determining, by one or more processing units in the first job system, contexts of the first job, the contexts of the first job including a context related to the first container, and sending, by one or more processing units in the first job system, the first job together with the contexts of the first job to the scheduler.

The above summary is not intended to describe each illustrated embodiment or every implementation of the present invention.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of certain embodiments and do not limit the invention.

Figure 1:
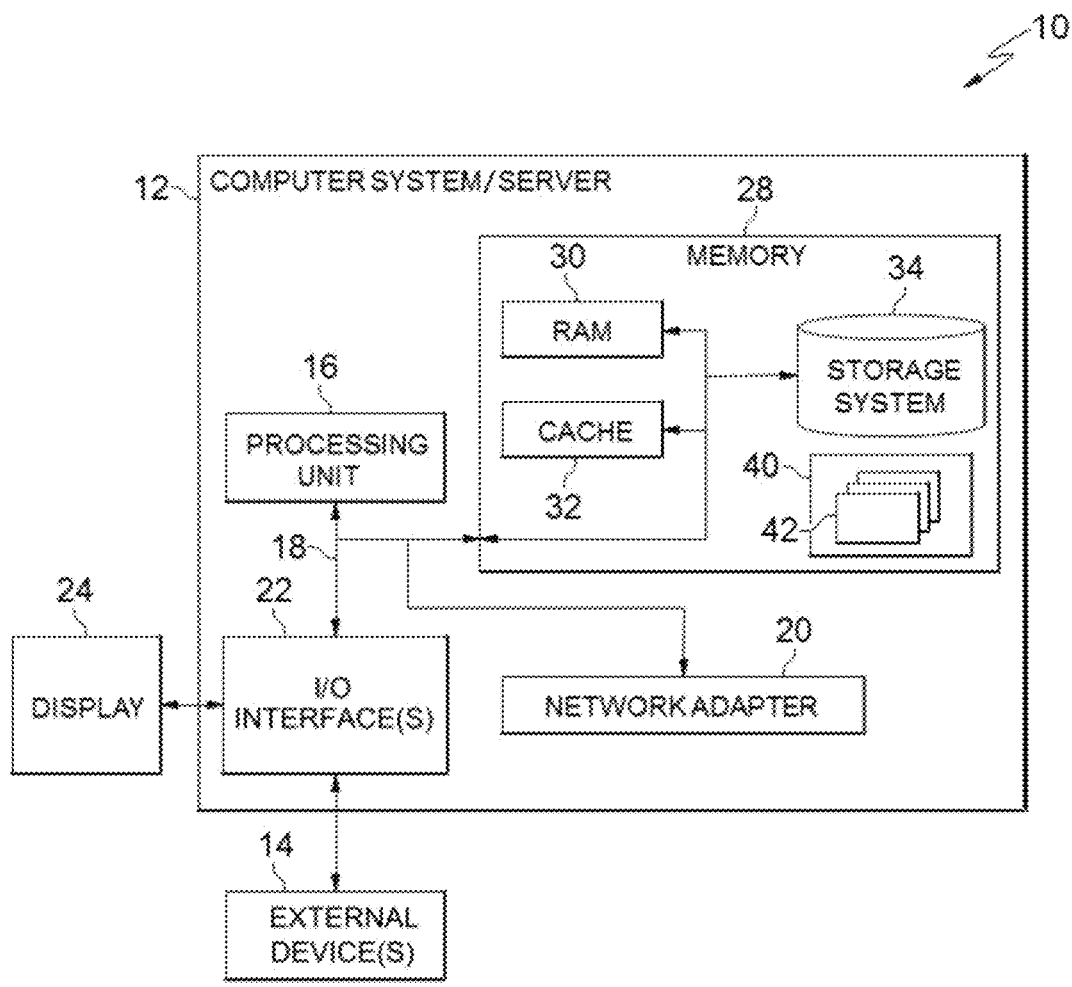
FIG. 1 depicts a block diagram of an example computer system environment, according to some embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Referring to FIG. 1, computer system 10 is a computer system/server 12 shown in the form of a general-purpose computing device, according to some embodiments. In some embodiments, computer system/server 12 is located on the linking device. In some embodiments, computer system 12 is connected to the linking device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to, microcode, device drivers, redundant processing units, external disk drive arrays, RAID systems, tape drives, data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
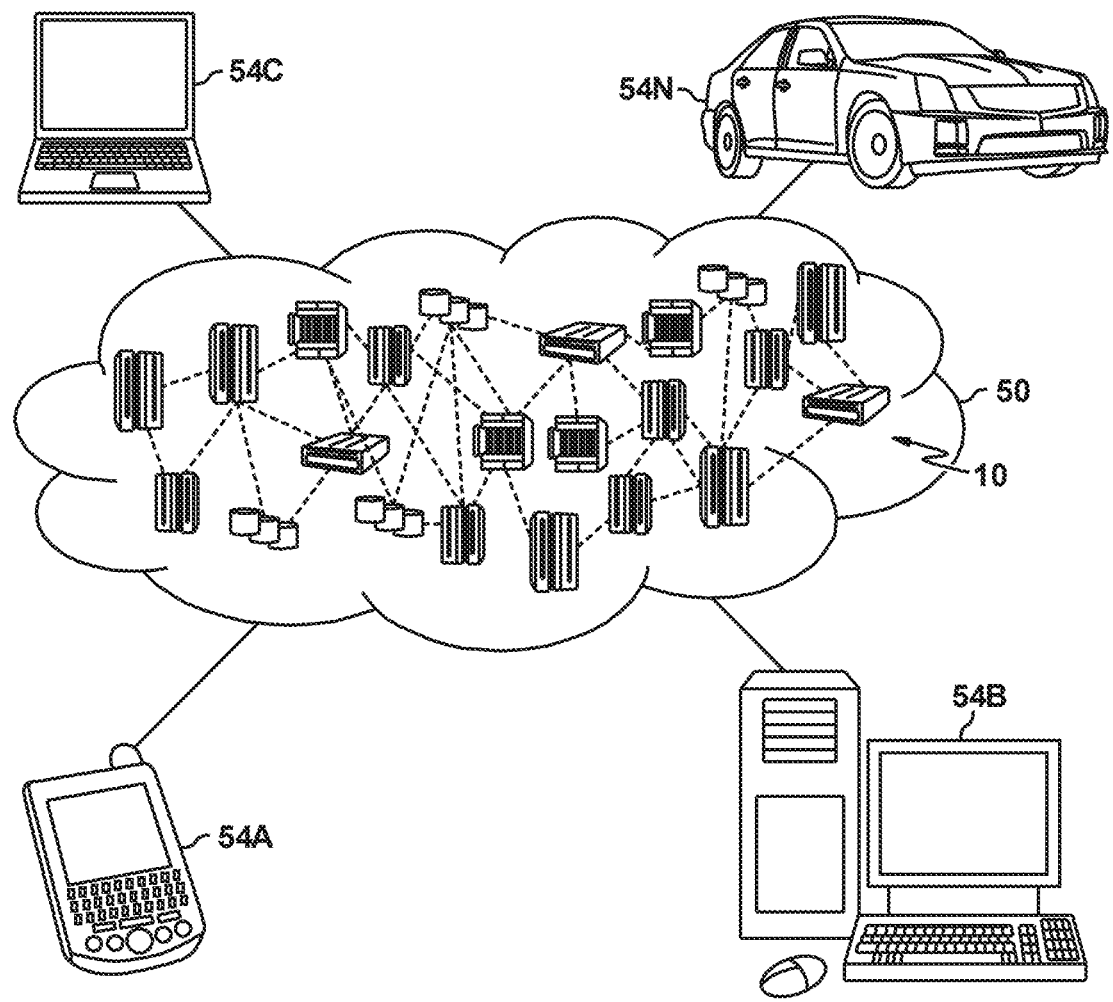
FIG. 2 depicts a cloud computing environment, according to some embodiments of the present invention.

Referring now to FIG. 2, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
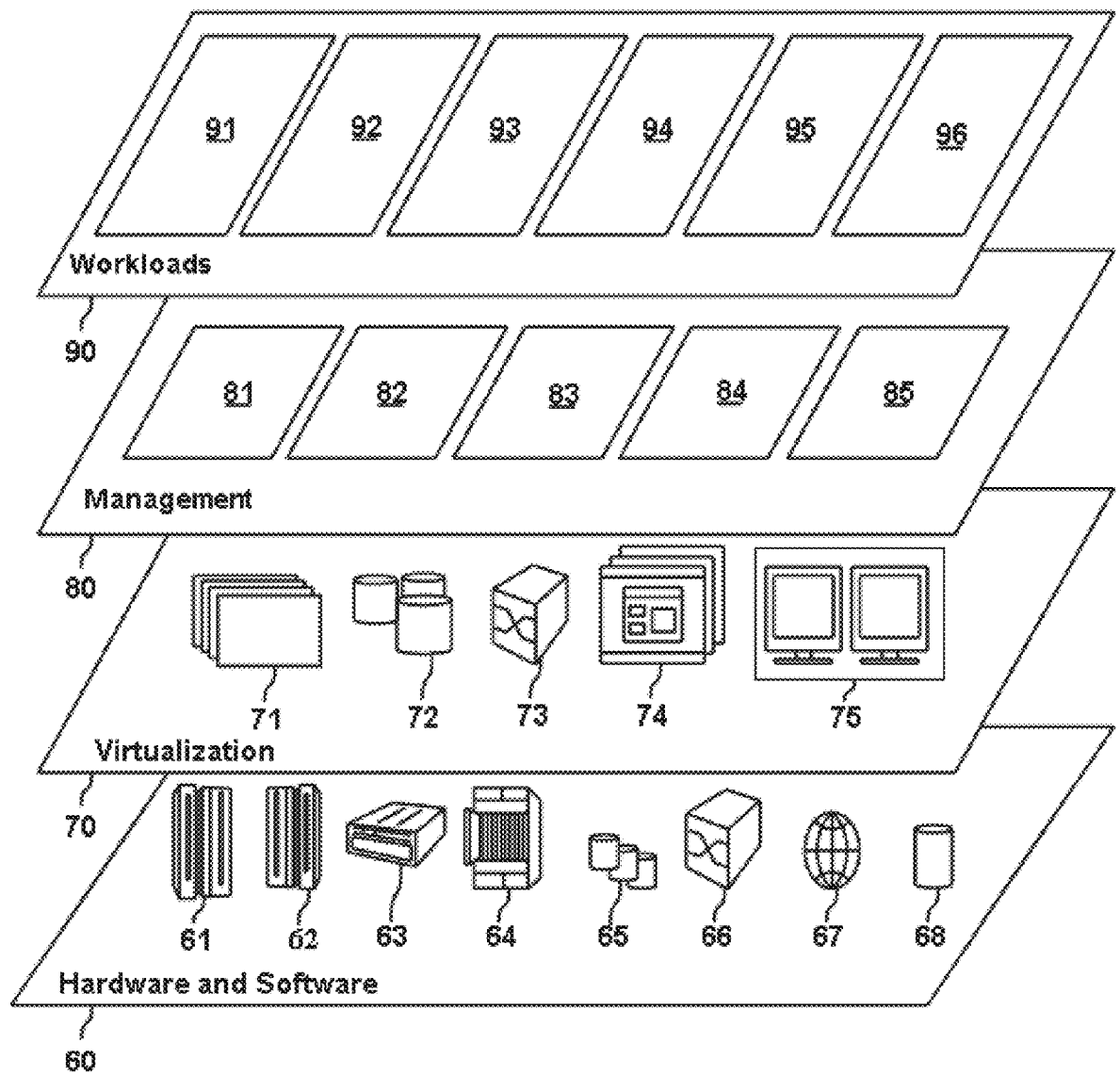
FIG. 3 depicts abstraction model layers, according to some embodiments of the present invention.

Referring now to FIG. 3, a set of functional abstraction layers 300 provided by cloud computing environment 50 (FIG. 2) is shown, according to some embodiments. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and job management 96.

Figure 4:
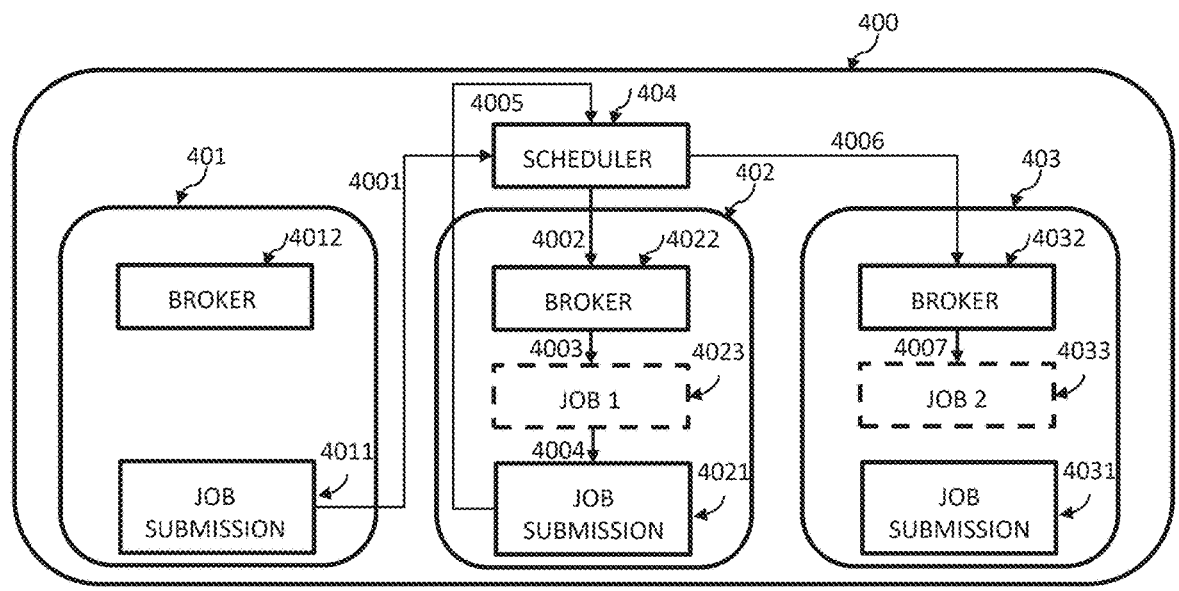
FIG. 4 depicts a schematic diagram of an existing job management environment.

In both HPC and HTC technologies, jobs are processed by a job management environment. Herein, a job means a workload to be processed in the job management environment, such as a command, an operation, an application, and the like, which may be expressed as execution binaries or scripts, such as a binary to computing value of Pi, a simulation program for chip verification, and the like, with logic to have a user's work done. FIG. 4 depicts a schematic diagram of an existing job management environment 400, to explain the existing problem that the present invention solves. Though there are many components in a job management environment 400, only the components related to the invention are considered in this description, and other components unrelated to this invention are ignored. Referring to FIG. 4, suppose that the job management environment 400 comprises 3 job systems, e.g., a job system 401, a job system 402, and a job system 403, each of which is a job submission and running platform for the job management environment 400. In fact, the job management environment 400 may comprise N job systems, where N is an integer larger than one. The job management environment 400 may also comprise a scheduler 404, which receives a job submitted from one of the job systems (401, 402, 403), and then selects one of the job systems (401, 402, 403) to run the job based on a predefined policy, such as a resource requirement, time requirement, and so on. Each of the job systems (401, 402, 403) may comprise a job submission module, which is configured to submit a job to the scheduler 404, and a broker, which is configured to receive a job from the scheduler 404 and initiate the execution of the job. For example, the job system 401 may comprise a job submission module 4011 and a broker 4012, the job system 402 may comprise a job submission module 4021 and a broker 4022, and the job system 403 may comprise a job submission module 4031 and a broker 4032.

As shown in FIG. 4, in an example, a job 1 together with contexts of the job 1 is submitted from the job submission module 4011 in the job system 401 by a user to the scheduler 404, as indicated by line with arrow 4001. The scheduler 404, after receiving the job 1, may select the job system 402 to run the job 1, and may send the job 1 together with the contexts of the job 1 to the broker 4022 as indicated by line with arrow 4002. The broker 4022 may make the job 1 4023 run based on the contexts of the job 1 as indicated by line with arrow 4003. As the job 1 may include a job 2, which needs the scheduler 404 to schedule. The running job 1 4023 may invoke the job submission module 4021 in the job system 402 to submit the job 2 together with contexts of job 2 to the scheduler 404 as indicated by line with arrow 4004. Then, the job submission module 4021 may submit the job 2 to the scheduler 404 as indicated by line with arrow 4005. The scheduler 404, after receiving the job 2, may select the job system 403 to run the job 2, and may send the job 2 together with the contexts of the job 2 to the broker 4032 as indicated by line with arrow 4006. The broker 4032 may make the job 2 4033 run based on the contexts of the job 2 as indicated by line with arrow 4007. The current contexts of a job in the existing job management environment, such as SLURM, LSF, PBS, HTCondor, Torque, etc., may include user-related information and job-related information, such as a user ID, job script, and other customization information.

Figure 5:
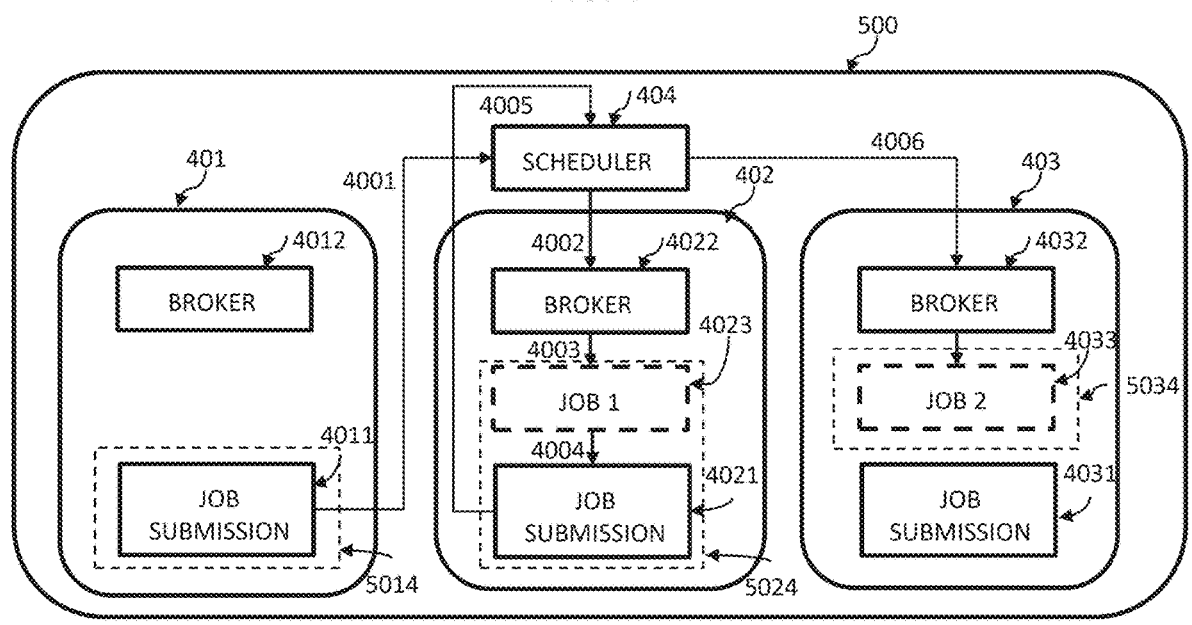
FIG. 5 depicts a schematic diagram of a job management environment, according to some embodiments of the present invention.

Currently cloud technology has been widely used. The containerized technologies in the cloud technology may use different containers to isolate different users to satisfy the requirement of security and privacy of users. In both HPC and HTC environment, a job may be submitted from a container for consideration of security and privacy. FIG. 5 depicts a schematic diagram of a job management environment 500, according to embodiments of the present invention. In FIG. 5, the components with the same reference numerals as those in FIG. 4 are the same or similar components as those in FIG. 4. As shown in FIG. 5, if the job 1 is submitted from a container 5014, the job 1 indicated by 4023 and job 2 indicated by 4033 should be run in containers 5024 and 5034 respectively, and the containers 5024 and 5034 should be the same container as the container 5014. In other words, the broker 4022 should make the container 5024 deployed in the job system 402 and the broker 4032 should make the container 5034 deployed in the job system 403, then the broker 4022 may make the job 1 run in the deployed container 5024 and the broker 4032 may make the job 2 run in the deployed container 5034. In this way, each of the job 1 and the job 2 can be limited to a corresponding container environment to satisfy security and privacy requirement. However, the existing job contexts do not include such a context related to a container, the broker 4022 and the broker 4032 cannot deploy corresponding container, which may make corresponding a job to run outside a containerized environment to cause security and privacy risk.

In addition, if the job 1 is submitted by a user from the container 5014 in the job system 401 to the scheduler 404, the user may have a privilege in the job system 401. For example, the user may be able to access a mounted network file system and/or a mounted local file system in the job system 401. The deployed containers 5024 and 5034 should inherit the privilege of the user.

In this invention, a new job management environment is proposed to solve the above problem. In the proposed job management environment, when a job is submitted from a container in a job system to a scheduler, the contexts of the job sent together with the job may include a context related to a container and/or an ID of the user submitting the job in the job system and/or a privilege of the user in the job system, so that another job system, when receiving the job submitted from the container, may deploy a same container based on the context related to the container, and also inherit the privilege of the user in the deployed container. The new job management environment may provide privacy and security for jobs submitted from containers.

Figure 6:
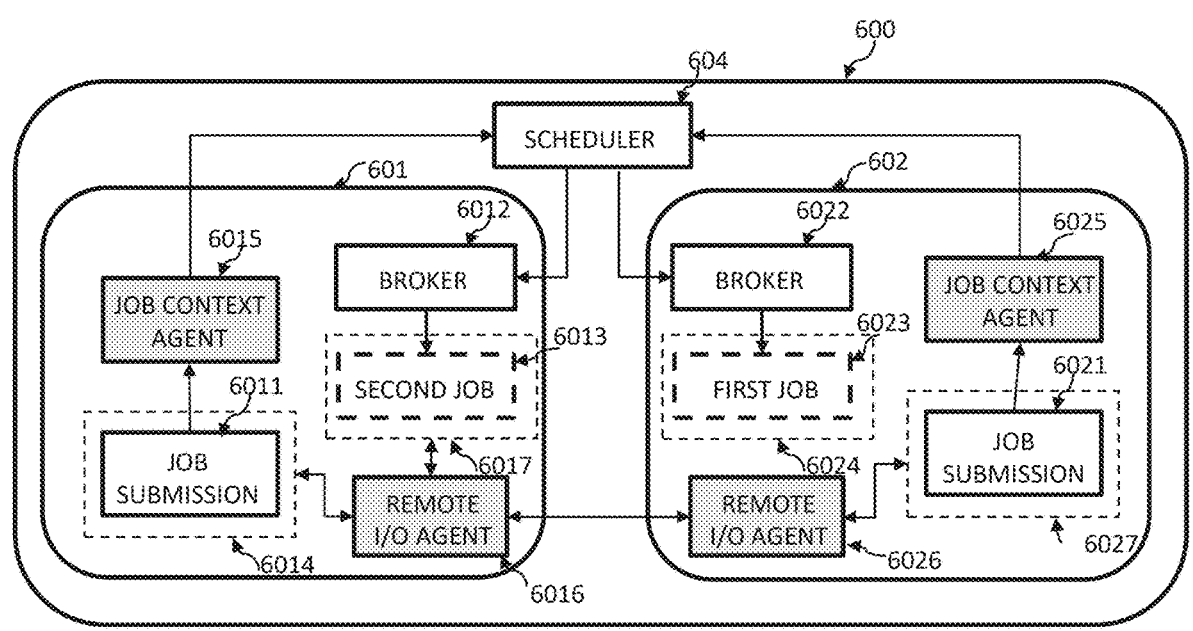
FIG. 6 depicts a schematic diagram of a proposed job management environment, according to some embodiments of the present invention.

FIG. 6 depicts a schematic diagram of a proposed job management environment 600, according to some embodiments of the present invention. It should be pointed out that though there are many components in the job management environment 600, only the components related to the invention are considered in this description, and other components unrelated to this invention are ignored. Referring to FIG. 6, suppose that the job management environment 600 comprises 2 job systems, e.g., a job system 601 and a job system 602, each of which is a job submission and running platform for the job management environment 600. In fact, the job management environment 600 may comprise N job systems, where N is an integer larger than one. The job management environment 600 may also comprise a scheduler 604, which receives a job submitted from a job system, and then selects a job system to run the job based on a predefined policy, such as a resource requirement, time requirement, and so on. A job system may comprise a job submission module, which is configured to submit a job to the scheduler 604, and a broker, which is configured to receive a job from the scheduler 604 and initiate the execution of the job. In addition, a job system may comprise a job context agent, which is configured to collect contexts of a job to be submitted to the scheduler 404. For example, the job system 601 may comprise a job submission module 6011, a broker 6012, and a job context agent 6015; the job system 602 may comprise a job submission module 6021, a broker 6022, and a job context agent 6025.

All components inside of the job management environment 600 are connected directly or indirectly via communication network (not shown in FIG. 6). The communication network in FIG. 6 may include various types of communication networks, such as a wide area network (WAN), local area network (LAN), a telecommunication network, a wireless network, a public switched network and/or a satellite network. The communication network may include connections, such as wire, wireless communication links, or fiber optic cables.

Each component in the job management environment 600 may be, for example, a mobile device, a telephone, a personal digital assistant, a netbook, a laptop computer, a tablet computer, a desktop computer, or any type of computing device capable of running a program and accessing a network. The job management environment 600 may operate in a cloud computing service model, such as Software as a Service (SaaS), Platform as a Service (PaaS), or Infrastructure as a Service (IaaS). The job management environment 600 may also be in a cloud computing deployment model, such as a private cloud, community cloud, public cloud, or hybrid cloud.

In some embodiments, take the job system 601 as an example to describe the functions of a job system, the functions of other job systems are similar. A job submission process will be described in conjunction with FIG. 6. As shown in FIG. 6, the job submission module 6011 in the job system 601 may send a first job to the scheduler 604. In response the first job being sent to the scheduler 604, the job context agent 6014 in the job system 601 may intercept the first job from being sent to the scheduler 604. Then, the job context agent 6014 may determine whether the first job is submitted from a container 6014 in the job system 601. To make the determination, the job context agent 6014 must be outside the container 6014, as shown in FIG. 6. The determination can be implemented by the job context agent 6014 by querying with the operation system of the job system 601 using system API. For example, the UNIX system provides such kind of API. If the job context agent 6015 determines that the first job being sent to the scheduler 604 is submitted from the container 6014 in the job system 601, the job context agent 6015 may determine job contexts of the first job, the context of the first job including a context related to the container (6014). Then, the job context agent 6015 may send the first job together with the contexts of the first job to the scheduler 604. In some embodiments, the context related to the container (6014) may include necessary information to deploy a container, such as a corresponding image or a location of the image, and the like. The context related to the container (6014) can be obtained by the job context agent 6014 by querying to the system of the job system 601 using system API. For example, UNIX system provide such kind of API. In this way, the contexts of the first job may be propagated to a job execution environment, i.e., a job system selected by the scheduler to run the first job.

In some embodiments, after receiving the first job together with the contexts of the first job, the scheduler 604 may select such as the job system 602 to run the first job. As shown in FIG. 6, the broker 6022 in the job system 602 may deploy a container 6024 based on the context related to the container (6014) comprised in the contexts of the first job and make the first job 6023 run in the deployed container 6024. The detailed implementation after receiving a job assignment from the scheduler 604 for the job system 602 will be omitted here and the detailed implementation after receiving a job assignment from the scheduler 604 for a job system will be introduced still by taking the job system 601 as an example later.

In some embodiments, in addition to the context related to the first container, the contexts of the first job may further include an ID of a first user submitting the first job in the job system 601 and a privilege of the first user in the job system 601. Referring to FIG. 6, as the first job is submitted by the first user from the container 6014, the first user should be a user of the container 6014. There may be more than one user in the container 6014 and each user should be a user of the job system 601. Thus, the first user should be a user of the job system 601 and may have a privilege in the job system 601. For example, the first user may be able to access a mounted network file system and/or a mounted local file system in the job system 601 using such as the user ID in the job system 601 and a corresponding password. The privilege of the first user in the container 6014 should be inherited by first job 6023 in the deployed container 6024 so that the first job 6023 may, for example, access the mounted network file system and/or the mounted local file system in the job system 601. The privilege of the first user in the job system 601 may be obtained by using an ID of the first user in the container 6014. Note, the ID of the first user in the container 6014 may be different from the ID of the first user in the job system 601. In some embodiments, the job system 601 may maintain two mappings, one is a mapping between an ID of a user in the container 6014 and an ID of a user in the job system 601, another is a mapping between an ID of a user in the job system 601 and the privilege of the first user in the job system 601. The privilege of the first user may be obtained by the job context agent 6015 using system API provided by the job system 601 based on the above two mappings.

In some embodiments, in addition to the context related to the first container, the ID of the first user submitting the first job in the job system 601, and the privilege of the first user in the job system 601, the contexts of the first job further includes customized contexts of the first job, which belongs to existing art in both HPT and HTC and can be obtained when intercepting the first job. The job context agent 6015 may determine the customized contexts of the first job, the context related to the first container, the ID of the first user submitting the first job in the first job system, and the privilege of the first user in the first job system, respectively, and combine them into the contexts of the first job.

In some embodiments, the job system 601 further comprises a remote I/O agent 6016 if the privilege of the first user in the job system 601 includes the mounted local file system in the job system 601 accessible to the first user. The remote I/O agent 6016 is configured to monitor a register request from another job system for accessing the mounted local file system in the job system 601. For example, if a remote I/O agent 6026 in the job system 602 sends a registering request, the remote I/O agent 6016 may authenticate whether the register is qualified such as using the ID of user in the job system 601 and the corresponding password. If the register is qualified, i.e., a successful register, the remote I/O agent 6016 may enable the remote I/O agent 6026 in the job system 602 to access the mounted local file system in the job system 601.

In some embodiments, the job system 601 may be a job system selected by the scheduler 604 to run a job. A job execution process will be described in conjunction with FIG. 6. Referring to FIG. 6, the job context agent 6025 may send a second job together with contexts of the second job to the scheduler 604. The second job is submitted from a container 6027 in the job system 602. The scheduler 604 may select the job system 601 to run the second job. After receiving the second job together with the contexts of the second job from the scheduler 604, the broker 6012 in the job system 601 may determine whether the contexts of the second job comprise a context related to the container (6027). If the broker 6012 determines that the contexts of the second job comprise the context related to the container (6027), the broker 6012 may deploy a container 6017 based on the context related to the container (6027) and make the second job 6013 run in the deployed container 6017. And if the broker 6012 determines that the contexts of the second job does not comprise the context related to the container (6027), the broker 6012 may just make the second job run in the job system 601. The deploying the container 6017 and making the second job run in the deployed container 6017 includes interacting with the job system 602 to provision, configure the container, and launch one or more compute instances to run the second job. The detailed implementation can be carried out using existing art well known to those skilled in the art and is omitted here. In this way, the second job 6013 may be isolated in the container 6017 from other jobs or other users outside the container 6017 in the job system 601 to satisfy the requirement of security and privacy.

In some embodiments, the contexts of the second job also include an ID of a second user submitting the second job in the job system 602 and a privilege of the second user in the job system 602. Then, the broker 6012 of the job system 601, after deploying the corresponding container 6017, may further determine whether the privilege of the second user submitting the second job comprises a mounted network file system accessible to the second user. If yes, the broker 6012 may mount the mounted network file system for second job 6013 in the container 6017 in the job system 601 by building a link to the mounted network file system using information included in the privilege of the second user, such as a user ID and/or password of the user, etc., so that the second job 6013 running in the container 6017 may access the mounted network file system. In this way, the second job 6013 running in the job system 601 may inherit the capability of the user submitting the job in the original job system to make the second job run more efficiently meanwhile satisfy the requirement of security and privacy. In some embodiments, after the second job is finished, the result of the second job may be sent back to the job system 602, and the deployed container in the job system 601 may be undeployed.

In some embodiments, the broker 6012 in the job system 601, after deploying the corresponding container 6017, may further determine whether the privilege of the second user submitting the second job comprises a mounted local file system in the job system 602 accessible to the second user. If yes, the broker 6012 may instruct the remote I/O agent 6016 to register to the job system 602, i.e., register to a remote I/O agent 6026 in the job system 602 by using, such as, the ID of the second user and/or password of the second user, etc. comprised in the privilege of the second user in the contexts of the second job. If the register is successful, the remote I/O agent 6016 may access the mounted local file system in the job system 602 through the remote I/O agent 6026 when needed.

It should be noted that any job system of the plurality of the job systems comprised in the job management environment 600, such as the job system 601 or 602, according to embodiments of the present invention, could be implemented by computer system/server 12 of FIG. 1. It also should be noted that any job system of the plurality of the job system comprised in the job management environment 600, according to embodiments of the present invention, could be implemented in any computer system. In some embodiments, any job system of the plurality of the job system comprised in the job management environment 600 can be a cloud computing environment (such as cloud computing environment 50 from FIG. 2).

Figure 7:
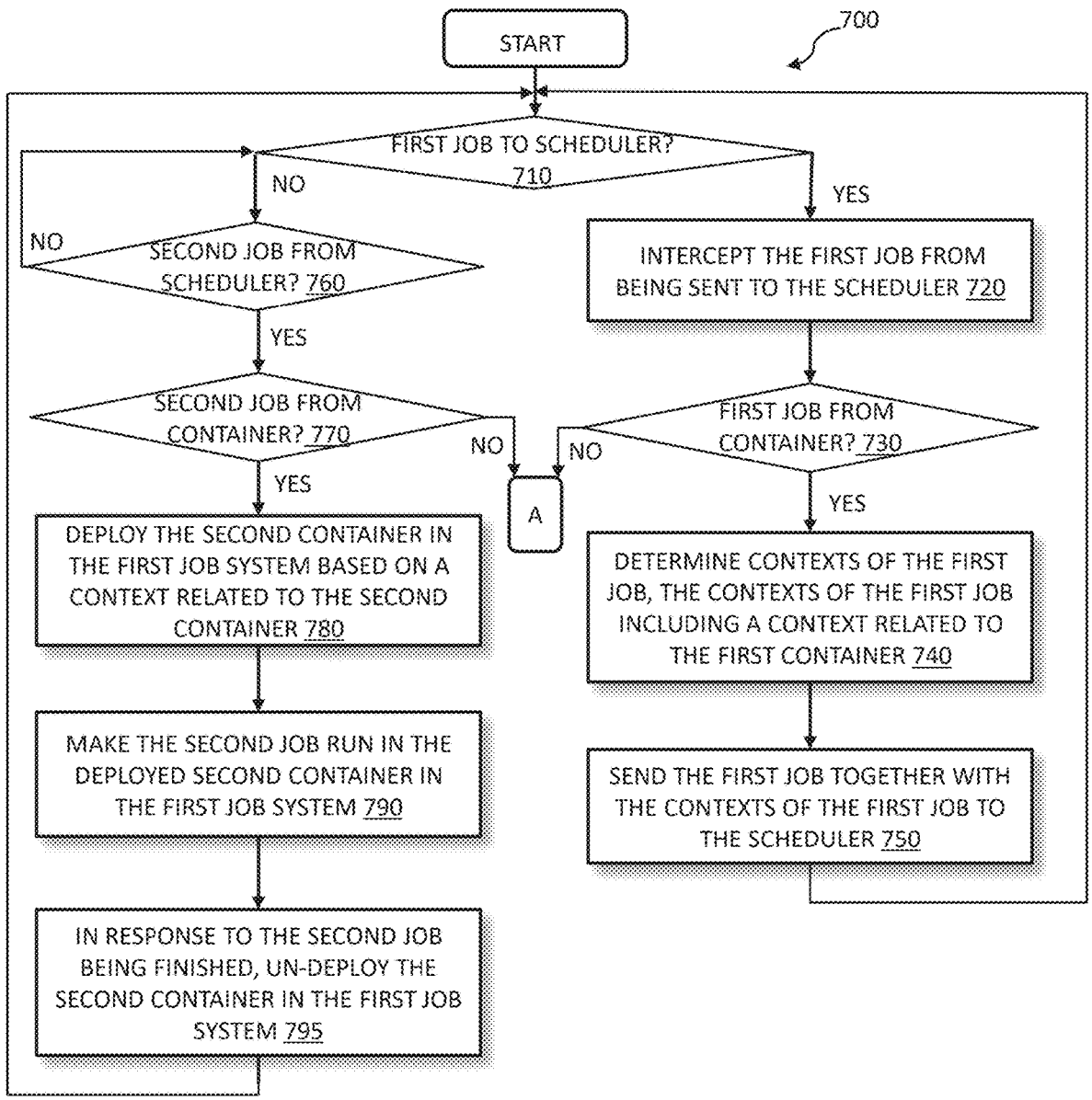
FIG. 7 depicts a flowchart for a job management in a job management environment, according to some embodiments of the present invention.

FIG. 7 depicts a flowchart 700 for a job management in a job management environment according to some embodiments of the present invention. The flowchart 700 may be implemented by a job system 601 comprised in the job management environment 600, or other suitable computer/computing systems. For ease of understanding, the flowchart 700 will be described with reference to FIG. 6.

At 710, the job system 601 may determine whether the job system 601 receives a first job sent to the scheduler 604.

At 720, in response to a first job being sent to the scheduler 604 from the first container 6014 in the first job system 601, the job system 601 may intercept the first job from being sent to the scheduler 604 in order to add necessary information to the first job, such as the further contexts of the first job.

At 730, the job system 601 may determine whether the first job is submitted from the first container 6014 in the first job system 601. If the first job is not submitted from a first container 6014 in the first job system 601, the process 700 will go the process A which is the existing process in the job management environment 400.

At 740, in response to determining that the first job is submitted from a first container 6014 in the first job system 601, the job system 601 may determine contexts of the first job, the contexts of the first job including a context related to the first container (6014).

At 750, the job system 601 may send the first job together with the contexts of the first job to the scheduler 604. Thus, a job system receiving the first job for execution, such as the job system 602, may know that the first job is submitted from a container and should be run in such kind of container so that the job system receiving the first job may deploy the similar execution environment for the first job.

At 760, the job system 601 may determine whether the job system 601 receives a second job for running together with contexts of the second job from the scheduler 604. In some embodiments, the step 710 and step 760 can be two parallel steps.

At 770, in response to receiving the second job for running together with the contexts of the second job sent from the scheduler 604, the job system 601 may further determine whether the contexts of the second job comprise a context related to the second container, i.e., whether the second job is from a second container in the job system 602.

At 780, in response to determining that the contexts of the second job comprise the context related to the second container, the job system 601 may deploy the second container in the job system 601 based on the context related to the second container.

At 790, the job system 601 may further make the second job run in the deployed second container in the job system 601.

In some embodiments, at 795, in response to the second job being finished, the job system 601 may send the result of the second job back to the job system 602, and the job system 601 may also un-deploy the deployed second container in the job system 601.

In some embodiments, in response to a determination that the contexts of the second job does not comprise the context related to the second container, the process 700 will go the process A which is the existing process in the job management environment 400.

In some embodiments, the contexts of the first job also includes an ID of a first user in the first job system and a privilege of the first user submitting the first job in the first job system.

In some embodiments, the privilege of the first user in the first job system includes a mounted network file system accessible to the first user and/or a mounted local file system in the first job system accessible to the first user.

In some embodiments, the determining the contexts of the first job comprises: the job system 601 may determine customized contexts of the first job, the context related to the first container, the ID of the first user submitting the first job in the first job system, and the privilege of the first user in the first job system respectively; and, then, the job system 601 may combine the customized contexts of the first job, the context related to the first container, the ID of the first user submitting the first job in the first job system, and the privilege of the first user in the first job system into the contexts of the first job.

In some embodiments, in response to determining that the privilege of the first user comprises a mounted local file system in the first job system accessible to the first user, the job system 601 may monitor a register request from other job system for accessing the mounted local file system in the first job system, and in response to a successful register, the job system 601 may enable another job system to access the mounted local file system in the job system 601.

In some embodiments, the step of deploying the second container in the first job system based on the context related to the second container further comprises: in response to determining that the contexts of the second job comprises the context related to the second container, and determining that a privilege of a second user submitting the second job in the job system 602 comprises a mounted network file system accessible to the second user, the job system 601 may mount the mounted network file system for the second job running in the second container in the first job system.

In some embodiments, the step of deploying the second container in the first job system based on the context related to the second container further comprises: in response to determining that the contexts of the second job comprises the context related to the second container, and determining that a privilege of a second user submitting the second job in the second job system comprises a mounted local file system in a second job system accessible to the second user, the job system 601 may register to the second job system. And in response to a successful register, the job system 601 may access the mounted local file system in the job system 602 when needed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method in a job management environment comprising a plurality of job systems and a scheduler for scheduling a job submitted to the job management environment to a job system for running, the method comprising:
    intercepting, by one or more processing units in a first job system and job context agent, from outside of a first container in the first job system, a first job from being sent to the scheduler;
    determining, by one or more processing units in the first job system and the job context agent, whether the first job is submitted from a container in the first job system; and
    in response to determining that the first job is submitted from a container in the first job system,
        determining, by one or more processing units in the first job system, contexts of the first job, the contexts of the first job including a context related to the first container and includes an ID (identification) of a first user in the first job system submitting the first job and a privilege of the first user in the first job system and
        the privilege of the first user in the first job system includes at least one of a mounted network file system accessible to the first user and a mounted local file system in the first job system accessible to the first user, and
        sending, by one or more processing units in the first job system, the first job together with the contexts of the first job to the scheduler.

2. The method of claim 1, wherein a broker module is configured to receive the job from the scheduler and initiate an execution of the job.

3. The method of claim 1, wherein the job context agent is configured to intercept the first job instead of being received by the scheduler and makes a determination whether to submit the first job by querying an operational system via an API.

4. The method of claim 1, wherein the determining the contexts of the first job comprises:
    determining, by one or more processing units in the first job system, customized contexts of the first job, the context related to the first container, the ID of the first user submitting the first job in the first job system, and the privilege of the first user in the first job system, respectively; and
    combining, by one or more processing units in the first job system, the customized contexts of the first job, the context related to the first container, the ID of the first user in the first job system submitting the first job, and the privilege of the first user in the first job system into the contexts of the first job.

5. The method of claim 1, further comprising:
    in response to determining that the privilege of the first user in the first job system includes a mounted local file system in the first job system accessible to the first user,
        monitoring, by one or more processing units in the first job system, a register request from a third job system for accessing the mounted local file system in the first job system, and
        in response to a successful register, enabling, by one or more processing units in the first job system, the third job system to access the mounted local file system in the first job system.

6. The method of claim 1, further comprising:
    in response to receiving a second job for running together with contexts of the second job sent from the scheduler,
        determining, by one or more processing units in the first job system, whether the contexts of the second job comprise a context related to a second container, and
        in response to determining that the contexts of the second job comprise the context related to the second container,
            deploying, by one or more processing units in the first job system, the second container in the first job system based on the context related to the second container, and
            running, by one or more processing units in the first job system, the second job in the deployed second container.

7. The method of claim 6, wherein the deploying the second container in the first job system based on the context related to the second container further comprises:
    in response to determining that a privilege of a second user submitting the second job in a second job system comprises a mounted network file system accessible to the second user, mounting, by one or more processing units in the first job system, the mounted network file system for the second job running in the second container in the first job system.

8. The method of claim 6, wherein the deploying the second container in the first job system based on the context related to the second container further comprises:
    in response to determining that a privilege of a second user submitting the second job in the second job system comprises a mounted local file system in the second job system accessible to the second user,
        registering, by one or more processing units in the first job system, the second job in the first job system with the second job system, and in response to a successful register, accessing, by one or more processing units in the first job system, the mounted local file system in the second job system when needed.

9. The method of claim 1, wherein a job system of the plurality of job system is a cloud environment.

10. A first job system in a job management environment comprising a plurality of job systems and a scheduler for scheduling a job submitted to the job management environment to a job system for running, comprising:
at least one processing unit; and
a memory coupled to the at least one processing unit and storing instructions thereon, the instructions, when executed by the at least one processing unit, performing actions including:
intercepting, by one or more processing units in a first job system and job context agent, from outside of a first container in the first job system, a first job from being sent to the scheduler;
determining, by one or more processing units in the first job system and the job context agent, whether the first job is submitted from a container in the first job system; and
in response to determining that the first job is submitted from a container in the first job system,
determining, by one or more processing units in the first job system, contexts of the first job, the contexts of the first job including a context related to the first container and includes an ID (identification) of a first user in the first job system submitting the first job and a privilege of the first user in the first job system and
the privilege of the first user in the first job system includes at least one of a mounted network file system accessible to the first user and a mounted local file system in the first job system accessible to the first user, and
sending, by one or more processing units in the first job system, the first job together with the contexts of the first job to the scheduler.

11. The first job system of claim 10, wherein a job context agent is configured to intercept the first job instead of being received by the scheduler and makes a determination whether to submit the first job by querying an operational system via an API.

12. The first job system of claim 10, further comprising:
in response to determining that the privilege of the first user in the first job system includes a mounted local file system in the first job system accessible to the first user,
monitoring a register request from a third job system for accessing the mounted local file system in the first job system, and
in response to a successful register, enabling the third job system to access the mounted local file system in the first job system.

13. The first job system of claim 12, further comprising:
in response to receiving a second job for running together with contexts of the second job sent from the scheduler,
determining whether the contexts of the second job comprise a context related to a second container; and
in response to determining that the contexts of the second job comprise the context related to the second container,
deploying the second container in the first job system based on the context related to the second container; and
running the second job in the deployed second container.

14. The first job system of claim 13, wherein the deploying the second container in the first job system based on the context related to the second container further comprises:
in response to determining that a privilege of a second user submitting the second job in a second job system comprises a mounted network file system accessible to the second user, mounting, by one or more processing units in the first job system, the mounted network file system for the second job running in the second container in the first job system.

15. The first job system of claim 13, wherein the deploying the second container in the first job system based on the context related to the second container further comprises:
in response to determining that a privilege of a second user submitting the second job in the second job system comprises a mounted local file system in the second job system accessible to the second user,
registering the second job in the first job system with the second job system, and
in response to a successful register, accessing the mounted local file system in the second job system when needed.

16. A computer program product used by a first job system in a job management environment comprising a plurality of job systems and a scheduler for scheduling a job submitted to the job management environment to a job system for running, comprising a computer-readable storage medium having program instructions embodied therewith, the program instructions executable by a first component with at least one processing unit in a cloud computing environment to cause the at least one processing unit to perform actions including:
intercepting, by one or more processing units in a first job system and job context agent, from outside of a first container in the first job system, a first job from being sent to the scheduler;
determining, by one or more processing units in the first job system and the job context agent, whether the first job is submitted from a container in the first job system; and
in response to determining that the first job is submitted from a container in the first job system,
determining, by one or more processing units in the first job system, contexts of the first job, the contexts of the first job including a context related to the first container and includes an ID (identification) of a first user in the first job system submitting the first job and a privilege of the first user in the first job system and
the privilege of the first user in the first job system includes at least one of a mounted network file system accessible to the first user and a mounted local file system in the first job system accessible to the first user, and
sending, by one or more processing units in the first job system, the first job together with the contexts of the first job to the scheduler.

17. The computer program product of claim 16, wherein a job context agent is configured to intercept the first job instead of being received by the scheduler and makes a determination whether to submit the first job by querying an operational system via an API.

18. The computer program product of claim 16, the actions further comprising:

in response to determining that the privilege of the first user in the first job system includes a mounted local file system in the first job system accessible to the first user,
monitoring a register request from a third job system for accessing the mounted local file system in the first job system, and
in response to a successful register, enabling the third job system to access the mounted local file system in the first job system.

19. The computer program product of claim 18, further comprising:
in response to receiving a second job for running together with contexts of the second job sent from the scheduler, determining whether the contexts of the second job comprise a context related to a second container; and
in response to determining that the contexts of the second job comprise the context related to the second container,
deploying the second container in the first job system based on the context related to the second container, and
running the second job in the deployed second container.

20. The computer program product of claim 19, further comprising:
in response to determining that a privilege of a second user submitting the second job in a second job system comprises a mounted network file system accessible to the second user, mounting, by one or more processing units in the first job system, the mounted network file system for the second job running in the second container in the first job system; and
in response to determining that a privilege of a second user submitting the second job in the second job system comprises a mounted local file system in the second job system accessible to the second user,
registering the second job in the first job system with the second job system, and
in response to a successful register, accessing the mounted local file system in the second job system when needed.

* * * * *